Figure 1:
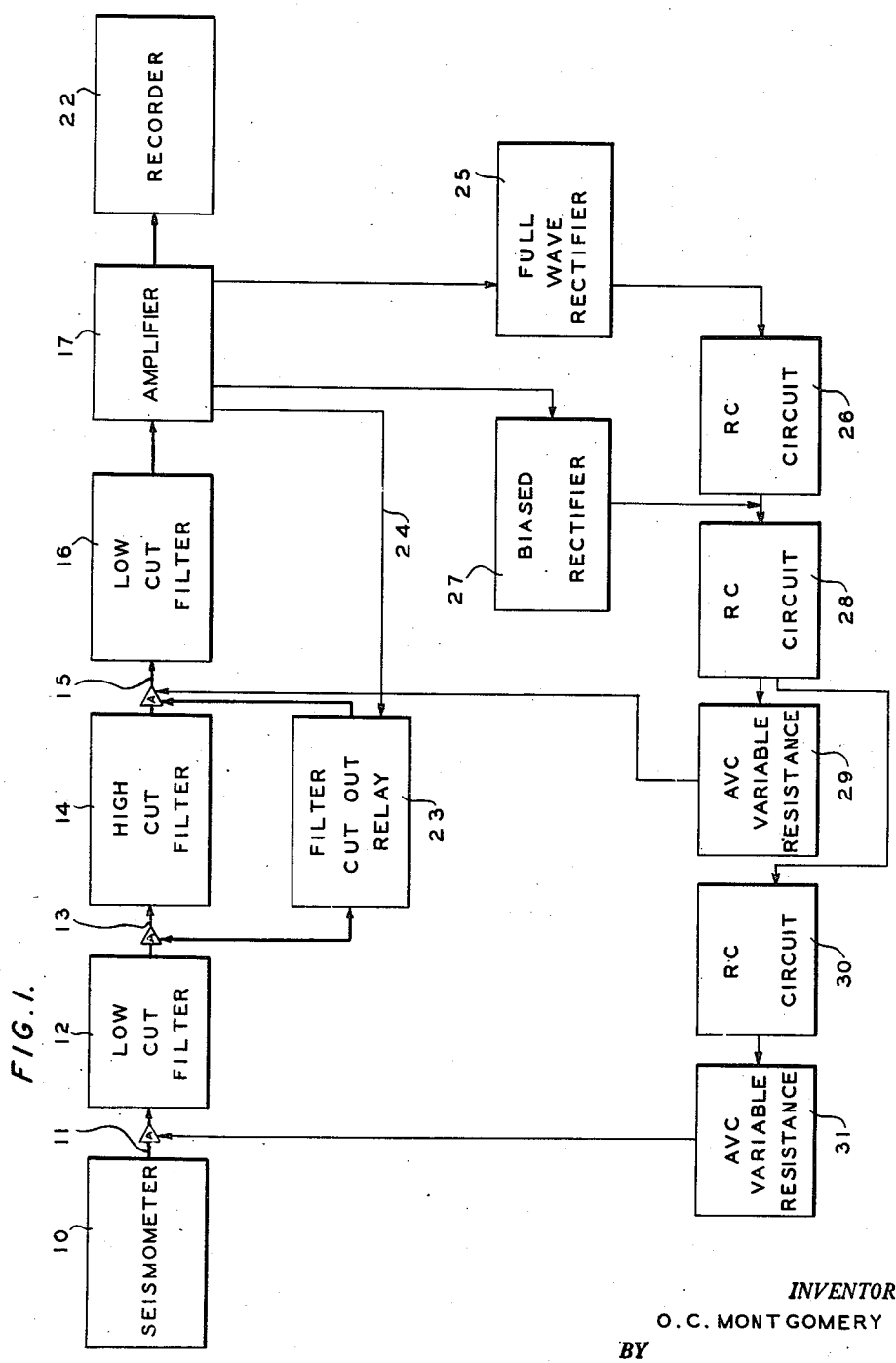
Figure 2A:
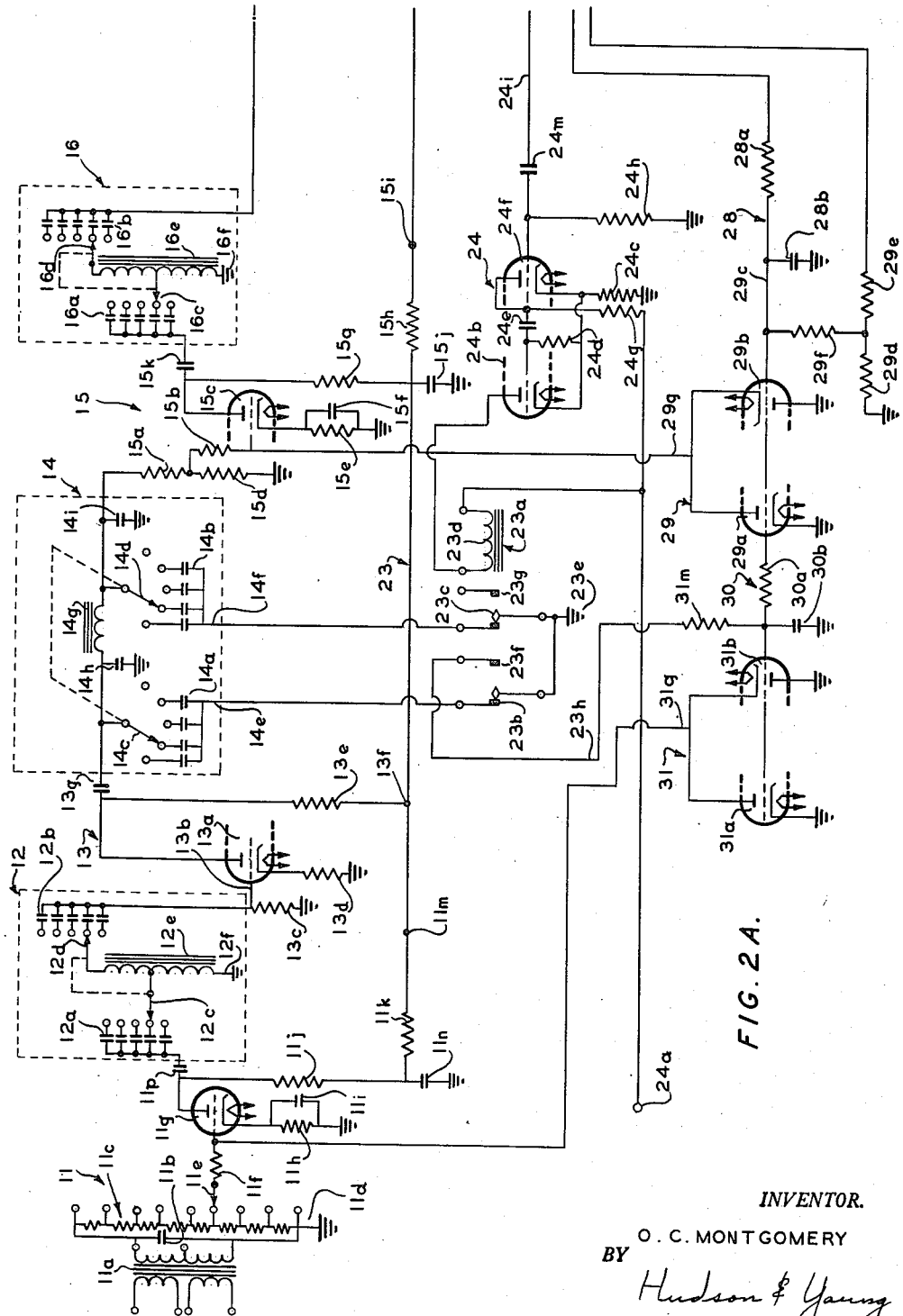
Figure 2B:
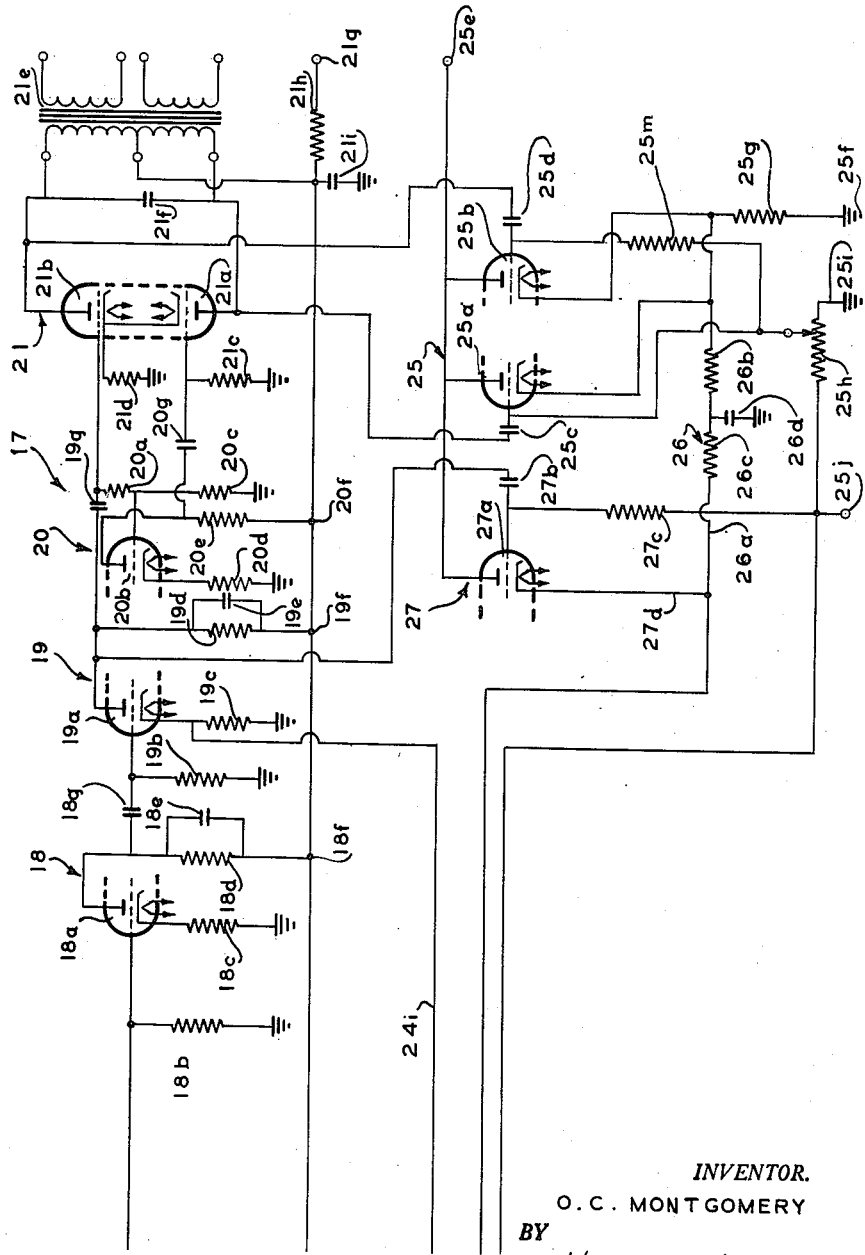

May 20, 1958     O. C. MONTGOMERY     2,835,746
AMPLIFIER WITH AUTOMATIC VOLUME CONTROL
Filed April 7, 1952     3 Sheets-Sheet 1

INVENTOR.
O. C. MONTGOMERY
BY
Hudson & Young
ATTORNEYS

May 20, 1958   O. C. MONTGOMERY   2,835,746
AMPLIFIER WITH AUTOMATIC VOLUME CONTROL
Filed April 7, 1952   3 Sheets-Sheet 2

INVENTOR.
O. C. MONTGOMERY
BY Hudson & Young
ATTORNEYS

May 20, 1958

O. C. MONTGOMERY 2,835,746

AMPLIFIER WITH AUTOMATIC VOLUME CONTROL

Filed April 7, 1952

3 Sheets-Sheet 3

INVENTOR.
O. C. MONTGOMERY
BY
Hudson & Young
ATTORNEYS

United States Patent Office

2,835,746
Patented May 20, 1958

2,835,746

AMPLIFIER WITH AUTOMATIC VOLUME CONTROL

Orin C. Montgomery, Bartlesville, Okla., assignor to Phillips Petroleum Company, a corporation of Delaware Application April 7, 1952, Serial No. 280,932

16 Claims. (Cl. 179—171)

This invention relates to amplifiers. In another aspect, it relates to amplifiers involving novel automatic volume control circuits. In still another aspect, it relates to seismic amplifiers in which a filter can be automatically cut into and out of the amplifier circuit.

In seismic surveying, an explosive charge is detonated at a location referred to as the shot point. A portion of the resulting seismic waves traverse subterranean formations and are absorbed thereby, or reflected or refracted therefrom. Some of the reflected and refracted waves again reach the surface and are converted into electrical voltages representative thereof by seismometers spaced from the shot point along the surface of the earth. The remainder of the waves produced by the explosion are propagated along the surface of the earth, and such waves yield no information concerning the subterranean strata.

The amplitude of the reflected or refracted waves received at the seismometer is quite small and, consequently, disturbances caused by such factors as wind, debris falling to the earth as a result of the explosion, and the movement of vegetation are not inconsequential, as compared to the seismic signal. Typically, the first waves received at a seismometer are of extremely high amplitude, as compared with the amplitude of the waves arriving at a later time in the recording period. Further, in certain areas, notably along the coast of Louisiana, the high frequency waves arriving at the initial part of the recording period are quite important but, during the latter portion of the recording period, they can seriously interfere with the accuracy of the seismic recording.

The foregoing considerations create substantial difficulties in the proper construction and arrangement of parts in the seismic amplifier, by which the minute seismic signals are increased in amplitude to a sufficient extent as to operate a seismic recorder. It is clear that the nature of the waves received at the seismometer station, in particular, the fact that the initial waves are of extremely high amplitude while succeeding waves are of much lower amplitude, requires the use of suitable automatic volume control circuits in the seismic amplifier. Otherwise, if the sensitivity of the recorder is adjusted so that the high amplitude waves are properly recorded, the low amplitude part of the recording will be of such small amplitude as to be indistinguishable upon the record. Conversely, if the sensitivity is adjusted so as to properly record the low amplitude waves, the recorder trace will move off the chart when the high amplitude signals are received.

Many of the problems encountered in the construction of automatic volume control circuits have been overcome in the manner taught by my copending application, Serial No. 117,478, filed September 23, 1949, entitled Automatic Volume Control System, now Patent 2,673,899. In this case, there is disclosed a seismic amplifier embodying an automatic volume control circuit of long time constant which gradually increases the amplifier gain responsive to the gradually decreasing signal level during the recording period. This circuit also embodies an automatic volume control circuit of short time constant to make relatively fast adjustments in gain responsive to sudden increases in the amplitude of the seismic signal. In said copending application, the automatic volume control signals are applied directly to a suitable control electrode of one amplifier tube and, through a resistance-capacitance network, to a control electrode of a preceding tube in the amplifier.

I have now found that the results obtained with this amplifier can be substantially improved where the automatic volume control voltages, instead of being applied directly to the control electrodes, are utilized to vary the resistance of an electronic discharge device connected in the input circuit of the amplifier tube. Further, smoother operation can be obtained where the long time constant control signal is produced by a full wave rectifier fed by the push pull output stage of the amplifier. This permits more power to be obtained for actuating the automatic volume control system and produces a smoother regulating signal. In such case, the short time constant automatic volume control signal is advantageously derived by rectification of a signal from an amplifier stage preceding the output push pull stage, this rectifier being biased so that it is actuated only by signals of greater than a predetermined amplitude. In this manner, rapid compensation is obtained when sudden changes in amplitude occur.

Where it is desirable to record the original high frequency signals but not later ones, I have found that a relay can be advantageously utilized to remove the high cut filter from the amplifier circuit or change its characteristics during the initial part of the recording period. The first signals passing through the amplifier then cause the relay to operate so as to connect the filter in the circuit in the usual manner, the relay remaining so actuated throughout the remainder of the recording period, when it is automatically restored to the position wherein the high cut filter is removed from the amplifier circuit. When such a relay is used, it is desirable to reduce the effectiveness of the automatic volume control circuits during the period when the high cut filter is removed from the circuit, which desirable result is also accomplished by the circuit of this invention.

Although the circuit of this invention is particularly adapted for use as a seismic amplifier, many of the features, elements, and combinations of the circuit can be used advantageously with other types of amplifiers and it is, accordingly, to be understood that the invention is not restricted to seismic amplifiers.

It is an object of the invention to provide an improved amplifier circuit.

It is a further object to provide an amplifier embodying improved automatic volume control circuits particularly adapted for use in seismic work.

It is a still further object to provide a seismic amplifier wherein the operation of a filter in the amplifier circuit is automatically controlled during the recording period.

It is a still further object to provide an amplifier which is reliable in operation, smooth acting, and which produces an output yielding a maximum amount of information when applied to a seismic recorder.

Various other objects, advantages and features of the invention will become apparent from the following detailed description taken in conjunction with the accompanying drawings, in which:

Figure 1 is a block diagram of an amplifier constructed in accordance with the principles of the invention; and Figure (2A, 2B) is a schematic circuit diagram of an amplifier constructed in accordance with my invention.

Referring now to Figure 1, the output of a seismometer 10 is fed through an input, coupling and amplifying circuit at 11 to a low cut (high pass) filter 12. The filtered signal passes through an amplifying and coupling circuit 13 to a high cut (low pass) filter 14, amplifying and coupling circuit 15, low cut filter 16 and amplifier 17 to a recorder 22. During the major portion of the recording period, the filters 12, 14 and 16 remove unwanted low frequency and high frequency components from the input signal to the amplifier so that the filtered output contains only a relatively narrow band or frequency in which the reflected and refracted waves are concentrated. In this manner signals produced by falling debris, wind, and the like are substantially minimized.

In some cases, it is desired that the high frequency, low amplitude signals be recorded during the initial part of the recording period, after which it is desirable that these high frequency components be attenuated. To this end, I have provided a filter cut out relay 23 which is normally so connected as to effectively remove filter 14 from the amplifier circuit or change its characteristics. Line 24 indicates a circuit whereby the relay 23 is controlled by the initial signals reaching amplifier 17 so as to insert the high cut filter 14 in the circuit a very short interval after the first signals reach the amplifier 17. The action of the relay is such that the filter 14 remains in circuit during the remainder of the recording period, and is then disabled automatically until shortly after the start of the next recording period. It will be evident that the relay 23 could be used in connection with one of the low cut filters 12, 16 if this were desirable, or that the relay could be used to insert the filter in the amplifier circuit during the first part of the period and remove it from the circuit during the remainder of the period, if this were desirable.

Amplifier 17 has a push pull output stage, a portion of the output being fed to a full wave rectifier 25. The rectified output is then passed to a resistance capacitance circuit 26 which has the function of smoothing out or integrating the rectified voltage. The integrating action of this circuit is such that the output voltage of circuit 26 changes slowly and responds to long term changes in amplifier output. The combination 25, 26 can thus be referred to as an automatic volume control circuit of long time constant.

A signal is also withdrawn from a single ended stage of amplifier 17 preceeding the push pull output stage. This signal is applied to a rectifier 27 which is so biased as to produce an output signal only when the voltage fed thereto is of greater than a predetermined magnitude. That is, rectifier 27 produces an output only in response to relatively large changes in amplitude of the signal passing through the main amplifier circuit. The output of biased rectifier 27 is mixed with the output of circuit 26, the mixed signal being fed to a resistance capacitance circuit 28. It will be noted, therefore, that the signal from rectifier 27 is not subjected to the integrating or delaying action of the circuit 26, so that the automatic volume control action produced thereby is more rapid than that produced by rectifier 25. The rectifier circuit 27 can, therefore, be referred to as an automatic volume control circuit of short time constant.

In the resistance-capacitance circuit 28, the combined voltages from units 26, 27 are further smoothed and integrated, after which they are passed to a variable resistance 29. This unit is preferably and advantageously an electronic discharge means of variable resistance which is connected in the input circuit of a tube in the amplifying and coupling device indicated by reference character 15. The impedance of this device varies in accordance with the magnitude of the voltage supplied by circuit 28 and thereby produces a corresponding change in the gain of the amplifier circuit. Thus, if the amplifier output increases rapidly, there is an increase in the AVC voltage supplied by rectifier 25 and, in addition, an output is produced by rectifier 27 with the result that the impedance of unit 29 is varied so as to quickly reduce the amplifier gain and keep the signal at a desirable level as it is fed to recorder 22. If the amplitude of the input signal to the recorder decreases slowly, a less positive voltage is produced by rectifier 25 and no signal is produced by biased rectifier 27. In this case, the impedance of unit 29 is slowly adjusted so as to provide a gradual increase in gain compensating for the decrease in amplitude of the input signal.

The signal from circuit 28 is also passed through a resistance-capacitance circuit 30 to a variable resistance 31. This variable resistance is also an electronic discharge means constituting a variable impedance in the input circuit of a tube forming a part of the coupling and amplifying circuit designated by reference numeral 11. Accordingly, the combined outputs of rectifier 27 and circuit 25 are also effective to vary the amplifier gain in the circuit 11. However, due to the additional integrating and smoothing action of the circuit 30, the gain changes produced by variable resistance 31 are slower and of less extent than those produced by variable resistance 29. However, both variable resistances have an approximately equal effect upon the amplifier output since the change in gain caused by variable resistance 31 is amplified in coupling stages 11 and 13 before the circuit 15 is reached, at which the gain changes produced by variable resistance 29 are effected.

It will be apparent, therefore, that the cooperation of circuit elements in the amplifier is such as to achieve the objects of the invention. A smooth and effective automatic volume control action is obtained to compensate rapidly for relatively sudden changes in the amplitude of signals fed through the amplifier and to compensate gradually for relatively slow changes in signal amplitude. Further, the high cut filter is removed from the circuit during the first part of the recording period and then automatically inserted into the circuit for the remainder of the recording period. After the termination of the recording, the high cut filter is again automatically removed from the circuit in readiness for a new cycle of operation.

Referring now to Figures (2A, 2B), which is a schematic circuit diagram of an amplifier constructed in accordance with the block diagram of Figure 1, the seismometer, not shown, is connected to the primary winding of an input transformer 11a forming a part of the coupling and amplifier circuit 11. The secondary winding of transformer 11a is shunted by a condenser 11b and a tapped resistance 11c serving as a manual gain control. One end of the secondary winding is grounded, as at 11d, and a contactor 11e engages a selected contact of the tapped resistance 11c, the contactor being connected through a fixed resistance 11f to the control grid of a triode amplifier tube 11g. The cathode of triode 11g is connected to ground through a bias resistor 11h which is shunted by a by pass condenser 11i. The anode of triode 11g is connected through an anode resistance 11j and a voltage dropping resistor 11k to a positive power supply terminal 11m, the junction between resistances 11j, 11k being connected to ground through a by pass condenser 11n. The anode of triode 11g is also connected by a coupling condenser 11p to the low cut filter 12.

The filter 12 includes two sets 12a, 12b of capacities of various values which can be selected, as desired, by contactors 12c and 12d, respectively. A center-tapped iron core inductance 12e has its center tap connected to contactor 12c, one end terminal connected to contactor 12d, and the other end terminal grounded at 12f. This filter attenuates frequencies lower than a predetermined value, the cut off frequency being determined by the selection of one of each of the sets 12a, 12b of capacities. The filtered amplified signal from unit 12 is impressed upon the control grid of a triode 13a forming a part of amplifier and coupling unit 13 by a lead 13b.

The amplifier tube 13a is provided with a grid resistance 13c, a cathode bias resistor 13d and an anode load resistor 13e which is connected to a positive power supply terminal 13f. The amplified output of tube 13a is fed through a coupling condenser 13g to high cut filter 14.

The filter 14 includes two sets 14a and 14b of capacities of different values which may be selected, as desired, by contactors 14c and 14d, respectively. The ground side of the sets 14a, 14b of condensers is connected to the respective common leads 14e and 14f. The high cut filter 14 further includes a series inductance 14g and two auxiliary grounded filter condensers 14h and 14i. When leads 14e and 14f are grounded, filter 14 attenuates components in the amplifier signal of higher than a predetermined frequency, the cut off frequency being determined by the selection of one of each set 14a, 14b of capacities. When leads 14e and 14f are not grounded, the filter is effectively removed from the circuit.

The filtered output from unit 14 passes through fixed resistances 15a, 15b to the control grid of a triode 15c forming a part of the amplifier and coupling unit 15. A fixed grid resistance 15d is connected between the junction of resistances 15a, 15b and ground. The cathode of triode 15c is grounded through a bias resistor 15e shunted by a by-pass condenser 15f, and the anode of this tube extends through fixed resistances 15g, 15h to a positive power supply terminal 15i, the junction between resistances 15g, 15h being grounded through a by-pass condenser 15j.

The amplified output of triode 15c is fed through a coupling condenser 15k to the second low cut filter 16. This filter is similar in construction and operation to filter 12, the sets 16a, 16b of capacitances, the contactors 16c, 16d and the inductance 16e corresponding to the similarly lettered parts of the filter 12.

The filtered output from unit 16 is passed to amplifier 17. This amplifier includes two stages 18, 19 of amplification connected in cascade, a phase inverter 20 and a push pull output stage 21. The respective amplifier stages 18, 19 are provided with triode amplifier tubes 18a, 19a, grid resistances 18b, 19b, cathode bias resistors 18c, 19c, anode load resistors 18d, 19d, by-pass condensers 18e, 19e, positive power supply terminals 18f, 19f, and coupling condensers 18g, 19g. It will be noted that both stages are single ended and that the amplifier output appearing at coupling condenser 19g is fed through a fixed resistance 20a to the control grid of phase inverter triode 20b, the grid of this tube also being connected to ground through a fixed resistance 20c. The cathode of phase inverter tube 20 is provided with a bias resistor 20d and the anode thereof is connected through a fixed resistance 20e to a positive power supply terminal 20f. The anode of tube 20 is also connected through a coupling condenser 20g to the control grid of one of the tubes 21a in the push pull output stage 21, the control grid of the other tube 21b being connected directly to coupling condenser 19g. The phase inverter tube 20 is thus equivalent to an input transformer in that it produces a signal 180° out of phase for proper excitation of one of the tubes of the push pull output stage. However, the weight and space required by such an input transformer is eliminated.

It will be noted that tube 21a has a grounded grid resistance 21c, and that the cathodes of tubes 21a, 21b are grounded through a common bias resistor 21d. The anodes of these tubes are connected to the respective end terminals of a center tapped primary winding of an output transformer 21e, these terminals being shunted by a condenser 21f. The center tap of the primary winding is connected to a positive power supply terminal 21g through a fixed resistance 21h, the center tap also being connected to ground through a filter condenser 21i. It will be noted that an operating potential is supplied from terminal 21g to each of the aforementioned power supply terminals 11m, 13f, 15i, 18f, 19f and 20f. The secondary winding of transformer 21e is connected to a suitable seismic recorder, not shown.

In accordance with the invention, it is desired that high cut filter 14 be removed from the circuit during the initial part of each recording period and thereafter be inserted into the circuit during the remainder of the recording period. To this end, I have provided the filter cut out relay circuit 23 which includes a relay 23a having two sets 23b, 23c of contacts which are closed when no current is supplied to the relay operating winding 23d. Accordingly, the leads 14e, 14f are grounded at 23e and the high cut filter is inserted in the amplifier circuit. When current is supplied to operating winding 23d, the electrical connection at contact sets 23b, 23c is broken and ground is applied to two contacts 23f, 23g to effectively remove the high cut filter 14 from the circuit and provide a ground at a lead 23h for a purpose to be hereinafter explained.

Prior to the initiation of a recording period, current is supplied to winding 23d by a circuit which can be traced from a positive power supply terminal 24a, forming a part of the relay control circuit 24, through winding 23d, the anode and cathode of a triode 24b and a fixed resistance 24c to ground. Tube 24b is normally conductive with the result that the relay 23d is energized and the high cut filter 14 is removed from the amplifier circuit. It will be noted that the control grid of triode 24b is connected through a fixed resistance 24d to the cathode thereof and through a condenser 24e to the anode of a triode 24f. The anode of tube 24f is also connected to positive power supply terminal 24a through a fixed resistance 24g. The cathode of triode 24f is connected to ground through a fixed resistance 24c and directly to the cathode of tube 24b. The control grid of triode 24f has a grounded grid resistance 24h and it is connected by a coupling condenser 24m and a lead 24i to the cathode of amplifier tube 19a.

In operation, as previously stated, the high cut filter 14 is removed from the circuit due to the energization of winding 23d of the two position relay 23. Accordingly, high frequency components of the signal can pass through the amplifier without attenuation. When the first signal reaches amplifier tube 19, the cathode of this tube becomes more positive with the result that a positive pulse is transmitted to the control grid of tube 24f, causing the tube to become conductive. As a result, the anode potential abruptly decreases and a negative pulse is impressed upon the control grid of tube 24b, causing this tube to become nonconductive. This breaks the circuit to relay winding 23d, causing the relay to close the circuits at contactors 23b, 23c with the result that leads 14e, 14f are grounded and the high cut filter is inserted into the amplifier circuit.

The time lag occurring in the operation of the relay permits the desired initial high frequency signals to be recorded, the filter thereafter attenuating such signals for the remainder of the recording period. At the end of the recording period, the grid potential of tube 24f is once more reduced, and this tube becomes nonconductive. As a result, tube 24b again becomes conductive after a time lag during which the condenser 24e is discharged through the fixed resistances associated therewith. Thereupon, winding 23d is again energized and the initial conditions are restored in preparation for a new cycle of operation. A suitable time constant for the described operation of the control circuit 24 is provided when the parts have the following values:

| | | |
|---|---|---|
| Condenser 24e | mfd | 1 |
| Resistance 24c | ohms | 3900 |
| Resistance 24d | megohms | 4.7 |
| Resistance 24g | do | 0.2 |

In further accordance with the invention, the output signal from push pull stage 21 is passed to full wave rectifier 25. This rectifier unit includes two triodes 25a and 25b, the control grids of which are connected through the respective coupling condensers 25c, 25d to the anodes of tubes 21a and 21b. The anodes of both tubes are connected to a positive power supply terminal 25e. The cathodes of both tubes extend to ground at 25f through a common load resistance 25g. The control grids of tubes 25a, 25b are further connected in a biasing network which includes a potentiometer 25h having its fixed terminals connected between ground at 25i and a source of negative potential 25j which may be maintained at a potential of 12 volts less than ground. The contactor of potentiometer 25h is connected directly to the control grid of tube 25a and through a fixed resistance 25m to the control grid of tube 25b. The output appearing across load resistor 25g is, therefore, a direct current volume control voltage derived from the signal output voltage, the amplitude level being determined by the bias impressed upon the control grids of tubes 25a, 25b by the setting of potentiometer 25h.

The last-mentioned output is passed through resistance capacitance circuit 26 to a lead 26a, this network including two series resistances 26b and 26c together with a capacity 26d. This circuit has a smoothing and integrating action upon the full wave rectified wave form produced by the unit 25. Due to this integrating effect, the voltage at lead 26a changes slowly in accordance with the variations in amplifier output voltage and short term disturbances have little effect upon the output voltage. A suitable smoothing and integrating action takes place where resistances 26b, 26c each have a value of 56,000 ohms and condenser 26d has a value of 1 mfd.

A short time constant automatic volume control voltage is also impressed upon the lead 26a by bias rectifier 27. This unit includes a triode 27a having its anode connected to positive power supply terminal 25e, the control grid of this tube being connected through a coupling condenser 27b to the anode of amplifier tube 19 and through a fixed resistance 27c to negative bias terminal 25j. The cathode of the tube is connected by a lead 27d to lead 26a.

The tube 27, therefore, rectifies a portion of the output of amplifier tube 19 and, due to the cut off bias impressed upon its control grid through fixed resistance 27c, an output is produced only when the amplifier signal is of greater than a predetermined value. This predetermined value is generally set so that only large changes in amplitude cause a voltage to be produced by tube 27a at the lead 26a. Further, the voltage impressed upon lead 26a by the triode 27a does not pass through the smoothing and integrating circuit 26. As a result, there is no integrating action and a quick response is obtained in the automatic volume control circuit to output voltages produced by tube 27a. Expressed differently, circuit 27 constitutes an automatic volume control of short time constant.

The combined output of circuits 26, 27 is impressed by lead 26a upon resistance-capacitance circuit 28. This circuit includes a fixed resistance 28a whose value is 100,000 ohms and a grounded shunt condenser 28b whose value is 4 mfd. Accordingly, this circuit provides an additional filtering and smoothing action upon the rectified current flowing through lead 26a.

The output of circuit 28 is fed to the variable resistance device 29. This device includes two triodes 29a and 29b, the control grids of which are both connected to a lead 29c which receives the output of circuit 28. A negative bias is impressed upon these control grids by a network which includes two series connected fixed resistances 29d, 29e connected between ground and negative bias terminal 25j, the junction between these resistances being connected to lead 29c through a fixed resistance 29f. The cathode of triode 29a and the anode of triode 29b are grounded while the anode of tube 29a and the cathode of tube 29b are connected to a lead 29g which extends to the control grid of amplifier tube 15c. These triodes function as variable resistances, the internal resistance of the tube being governed by the potential impressed upon the control grids from the automatic volume control circuits. Tube 29a functions during the positive swings of the signal voltage at the grid of tube 15c, since its anode is then positive with respect to ground, and tube 29b functions during the negative swings of the signal voltage, at which time the cathode potential of tube 29b is lower than ground. In such case, therefore, the anode of tube 29b is positive with respect to its cathode.

The variable resistance of this electronic discharge means acts in concert with the fixed resistance 15b to form a voltage divider regulating the proportion of signal voltage applied to the control grid of tube 15c and, hence, the gain of the amplifier. It will be noted that this voltage divider is connected in parallel with resistance 15d. I have found that the described variable resistance circuit provides an exceptionally smooth control of the amplifier gain and that it is responsive in a desirable manner to the changes in automatic volume control voltage produced in the circuits 25, 26 and 27.

The voltage appearing at lead 29c is also impressed upon resistance-capacitance circuit 30 which includes a series resistance 30a having a value of 100,000 ohms and a grounded shunt condenser 30b having a value of 6 mfd. This circuit further smooths out and integrates the voltage appearing at lead 29c and, in particular, decreases the amplitude of the voltage variations. The further rectified and smoothed signal is applied to variable resistance device 31 which is identical in structure and function with variable resistance device 29, similar parts being indicated by like reference letters. This tube acts to vary the gain of the amplifier by varying the resistance in the grid circuit of amplifier tube 11g. Since this tube is the first amplifier stage, a small change in gain has the same effect as a substantially larger change in gain at amplifier stage 15. However, due to the additional smoothing and filtering action of circuit 30, substantially the same effect is produced, in so far as gain is concerned, by an equal change in automatic volume control voltage. The application of the automatic volume control voltage to the control electrodes of the tubes, in this case, the control grids, results in a much smoother overall action of the amplifier and has been found quite advantageous in seismic work. It will be noted that lead 23h is connected through a fixed resistance 31m to the control grids of triode 31. Accordingly, when relay winding 23d is energized, the control grids of tubes 31a, 31b are grounded through resistance 31m which can have a value of 200,000 ohms, and the control grids of tubes 29a, 29b are grounded through resistances 30a, 31m. Thus, while the filter 14 is removed from the circuit and the high frequency components are being recorded, the response of the automatic volume control system is substantially decreased by the grounding of resistance 31m so that the initial high frequency waves are recorded with a high value of amplifier gain.

In the overall operation of the system, it will be noted that a small decrease in the amplitude of the signal passing through the amplifier causes a corresponding slow decrease in the automatic volume control voltage with a corresponding increase in the internal resistance of the tubes 29a and 29b, 31a and 31b. As a result, two control grids of tubes 11g, 15c are connected across a substantially larger portion of the voltage dividers defined by the respective units 11f, 31 and 15b, 29. As a result, the gain of the amplifier slowly increases. Such a slow decrease of signal level has no effect upon tube 27a due to the relatively high bias potential impressed thereon. A sudden decrease in gain also has no effect upon tube 27a since it is already biased below cut off and such decrease in gain merely has the effect of further decreasing the grid potential. However, a sudden increase in signal amplitude causes tube 27a to conduct with the result that a positive voltage is produced by tube 27a and the internal resistance of the triodes in circuits 29, 31 is decreased. This decreases the portion of the voltage divider across which the respective tubes 11g and 15c are connected so that the amplifier gain is reduced. This action is aided, to the extent that it is slow enough to be picked up, by an additional positive voltage produced in the rectifier circuit 25.

It will be evident that I have achieved the objects of the invention in providing an efficient volume control circuit for a seismic amplifier which is capable of compensating for both slow and rapid changes in signal level with a minimum of signal distortion and a maximum smoothness of operation. The variable resistance devices utilized to control the gain of the two amplifier stages have been found to contribute materially to the smoothness of operation and freedom from distortion. Further, I have provided a system whereby the high cut filter 14 is disabled during the initial part of the recording period, at which time high frequency low amplitude signals are accurately recorded with minimum attenuation due to the grounding of resistance 31m by operation of relay 23a. Shortly after the beginning of the recording period, the high cut filter is again inserted in the circuit which then operates in the usual manner during the remainder of the recording period. A short time after the end of the recording period, the high cut filter is automatically removed from the circuit in readiness for a new cycle of operation.

While the invention has been described in connection with a present, preferred embodiment thereof, it is to be understood that this description is illustrative only and is not intended to limit the invention.

I claim:

1. A multistage amplifier including a tube having a control electrode for regulating its gain, a voltage divider unit including a fixed resistance connecting said control electrode to one terminal of an input impedance, a pair of electronic discharge devices each having an anode, a cathode, and a control grid, means connecting the anode of one device and the cathode of the other device to said control electrode, and means connecting the cathode of said one device and the anode of said other device to an other terminal of said input impedance, a pair of output terminals, means for deriving a direct current volume control voltage from the signal output voltage of said amplifier and applying it to said pair of output terminals, means connecting one output terminal to said other terminal of said input impedance, and a single lead connecting the other output terminal to both of said control grids.

2. A multistage amplifier including a first tube having a first control electrode for regulating its gain, a second tube having a second control electrode for regulating its gain, a pair of voltage divider units associated with the respective tubes, each unit including a fixed resistance connecting a control electrode to one terminal of an input impedance, a pair of electron tubes each having an anode, a cathode, and a control grid, means connecting the anode of one electron tube and the cathode of the other electron tube to said control electrode, means connecting the cathode of said one electron tube and the anode of said other electron tube to an other terminal of said input impedance, a pair of first output terminals, means for deriving a direct current volume control voltage from the signal output voltage of said amplifier and applying it to said first output terminals, means connecting one first output terminal to said other terminal of said input impedance, a single lead connecting the other first output terminal to both control grids of the unit associated with said second amplifier tube, a pair of filter output terminals, means for filtering the voltage appearing across said first output terminals and applying the filtered voltage to said filter output terminals, means connecting one filter output terminal to said other terminal of the input impedance, and a single lead connecting the other filter output terminal to both control grids of the unit associated with said first amplifier tube.

3. In a seismic amplifier, in combination, a multistage amplifier including a tube having a control electrode for regulating its gain, and a push pull output stage, a full wave rectifier fed by said push pull stage to provide a direct current volume control voltage derived from the signal output voltage, means for filtering said last-mentioned voltage, a voltage divider unit including a fixed resistance connecting said control electrode to one terminal of an input impedance, a pair of electronic discharge devices each having an anode, a cathode, and a control grid, means connecting the anode of one device and the cathode of the other device to said control electrode, and means connecting the cathode of said one device and the anode of said other device to an other terminal of said input impedance, said volume control voltage being impressed upon a pair of filter output terminals, means connecting one of said filter output terminals to said other terminal of the input impedance, and a single lead connecting the other filter output terminal to the control grids of both electronic discharge devices.

4. In a seismic amplifier, in combination, a multistage amplifier including a first tube having a first control electrode for regulating its gain, a second tube having a second control electrode for regulating its gain, a push pull output stage, and a single ended stage immediately preceding said push pull stage, a phase inverter, means for applying a voltage from said preceding stage directly to one tube in said push pull stage, means for applying said voltage from the preceding stage to said phase inverter, means for supplying the inverted signal to the other tube in said push pull stage, a full wave rectifier fed by said push pull stage to produce a direct current volume control voltage derived from the signal output voltage, means for filtering said last-mentioned voltage, a pair of variable resistance devices connected between the respective control electrodes and ground, each such device including a pair of triodes having an anode and cathode connected in a circuit extending from said control electrode to ground, the cathode of each triode being connected to the anode of the other triode, means for applying said filtered output voltage to both control grids of the triodes in the variable resistance unit associated with said second tube, and an integrating circuit connecting said last-mentioned control grids to both control grids of the triodes in the variable resistance unit associated with said first tube.

5. In a seismic amplifier, in combination, a multistage amplifier including a tube having a control electrode for regulating its gain, a rectifier unit fed by one stage of said amplifier to produce a first rectified signal, a biased rectifier unit fed by another stage of said amplifier to produce a second rectified signal when the input to said device is greater than a predetermined amplitude, means for filtering the signal from said first rectifier unit so as to smooth out the wave form thereof, a variable resistance unit including a triode having its anode-cathode circuit connected between said control electrode and ground, and means for jointly applying said filtered signal and said second rectified signal to the control grid of said triode so as to vary the internal resistance thereof.

6. In a seismic amplifier, in combination, a multistage amplifier including a tube having a control electrode for regulating its gain, a push pull output stage, and a single ended stage preceding said push pull stage, a full wave rectifier fed by said push pull stage to produce a direct current volume control voltage derived from the signal output voltage, a filter for smoothing out said last-mentioned voltage, a biased rectifier fed by said single ended stage to produce a rectified output voltage when the signal at said single ended stage is of greater than a predetermined amplitude, and means for varying the potential on said control electrode jointly in accordance with the magnitude of said filtered output voltage and the rectified voltage from said single ended stage.

7. In a seismic amplifier, in combination, a multistage amplifier including a tube having a control electrode for regulating its gain, a push pull output stage, and a single ended stage preceding said push pull stage, a full wave rectifier fed by said push pull stage to produce a direct current volume control voltage derived from the signal output voltage, a filter for smoothing out said last-mentioned voltage, a biased rectifier fed by said single ended stage to produce an output voltage when the signal at said single ended stage is of greater than a predetermined amplitude, a voltage divider unit including a fixed resistance connecting said control electrode to one terminal of an input impedance, a pair of triodes, means connecting the anode of one triode and the cathode of the other triode to said control electrode, and means connecting the cathode of said one triode and the anode of said other triode to another terminal of said input impedance, and means for jointly applying to the control grids of both triodes the filtered output voltage and the voltage from said single ended stage.

8. In a seismic amplifier, in combination, a multistage amplifier including a first tube having a first control electrode for regulating its gain, a second tube having a second control electrode for regulating its gain, a push pull output stage, and a single ended stage preceding said output stage, a full wave rectifier fed by said push pull stage to produce a direct current volume control voltage derived from the signal output voltage, a filter for smoothing out the wave form of said last-mentioned voltage, a biased electron tube having an anode, a cathode, and a control grid, means for feeding a signal from said single ended stage to said control grid whereby said electron tube produces an output signal when the grid voltage is above a predetermined value, means for varying the potential on said second control electrode in accordance with the magnitude of said filtered voltage and the output voltage produced by said biased electron tube, means for further filtering and smoothing out said filtered voltage and the output voltage of said electron tube, and means for varying the potential on said first control electrode in accordance with the magnitude of said further filtered voltage.

9. In a seismic amplifier, in combination, a multistage amplifier including a first tube having a first control electrode for regulating its gain, a second tube having a second control electrode for regulating its gain, a push pull output stage, and a single ended stage preceding said output stage, a full wave rectifier fed by said push pull stage to produce a direct current volume control voltage derived from the signal output voltage, a filter for smoothing out the wave form of said last-mentioned voltage, a biased electron tube having an anode, a cathode, and a control grid, means for feeding a signal from said single ended stage to said control grid whereby said electron tube produces an output voltage when the grid voltage is above a predetermined value, a pair of voltage divider units associated with the respective control electrodes, each voltage divider unit including a fixed resistance connecting said control electrode to one terminal of an input impedance, a pair of triodes, leads connecting the anode of one triode and the cathode of the other triode to the associated control electrode, and leads connecting the cathode of said one triode and the anode of said other triode to another terminal of said input impedance, means for applying to the control grids of both triodes in the voltage divider unit associated with said second tube the filtered output voltage from said push pull stage and the voltage from said single ended stage, an integrating circuit of the resistance-capacitance type connecting said last-mentioned control grids with both control grids of the triodes in the voltage divider unit associated with said first tube.

10. In a seismic amplifier, in combination, a seismometer, a multistage amplifier including a filter, and a subsequent amplifier stage fed by said filter, the input of said amplifier being connected to said seismometer, a relay circuit for disabling said filter, and means responsive to the presence of a signal voltage at said subsequent amplifier stage to actuate said relay so as to introduce said filter into the amplifier circuit.

11. In a seismic amplifier, in combination, a seismometer, a multistage amplifier including a low cut filter, a high cut filter, and a subsequent amplifier stage fed by said high cut filter, the input of said amplifier being connected to said seismometer, a relay circuit for disabling said high cut filter, means for normally actuating said relay circuit to disable said high cut filter, and means responsive to the presence of a signal voltage at said subsequent amplifier stage to operate said relay circuit so as to insert said high cut filter into the amplifier circuit.

12. In a seismic amplifier, in combination, a seismometer, a multistage amplifier including a low cut filter, a high cut filter, and a subsequent amplifier stage fed by said high cut filter, the input of said amplifier being connected to said seismometer, a relay circuit for disabling said high cut filter, means responsive to the presence of a signal voltage at said subsequent amplifier stage to actuate said relay circuit so as to introduce said high cut filter into the amplifier circuit, and means for maintaining said relay circuit in such actuated condition for a predetermined period of time greater than that required for the recording of a seismogram.

13. In a seismic amplifier, in combination, a multistage amplifier including a low cut filter, a high cut filter, and a subsequent amplifier stage fed by said high cut filter, said high cut filter including a series inductance and a pair of shunt capacities, a relay having two sets of contacts for connecting said capacities to ground when the relay is deenergized, said capacities being disconnected from ground when the relay is energized, a normally conductive triode having the winding of said relay connected in its anode-cathode circuit to normally maintain said relay in energized condition, a second triode fed by said subsequent amplifier stage to impress a strong negative voltage upon the control grid of said first triode when a signal is received at said subsequent amplifier stage, whereby the relay is deenergized and the high cut filter is inserted in the amplifier circuit, and a resistance-capacitance circuit connected in the control grid circuit of said first triode to permit said negative signal to be exponentially reduced, thereby to restore said first triode to a conductive condition a short interval after said negative signal is terminated.

14. In a seismic amplifier, in combination, a multistage amplifier including a tube having a control electrode for regulating its gain, a high cut filter, and an amplifier stage subsequent to said high cut filter and fed thereby, said filter including a series inductance and a shunt capacity, a variable resistance unit including a triode having its anode and cathode connected in circuit with said control electrode and ground, means for rectifying a signal voltage from said subsequent stage, means for applying the rectified voltage to the control grid of said triode to vary the internal resistance thereof in accordance with the magnitude of said voltage, an impedance having one terminal connected to said control grid, a two position relay which is effective, in one position, to connect another terminal of said impedance to ground and which is effective, in its other position, to ground said shunt capacity and thereby introduce said high cut filter into the amplifier circuit, and means responsive to the presence of a signal at a subsequent amplifier stage to actuate said relay so as to ground said shunt capacity and disable the voltage reducing connection to said control grid.

15. In a seismic amplifier, in combination, a multistage amplifier including a first tube having a first control electrode for regulating its gain, a second tube having a second control electrode for regulating its gain, a low cut filter, a high cut filter including a series inductance and a pair of shunt capacities, a push pull output stage, a single ended stage preceding said push pull stage, a full wave rectifier fed by said push pull output stage to produce a first direct current volume control voltage derived from the signal output voltage, means for filtering said voltage, a biased rectifier fed by said preceding stage to produce a second direct current volume control voltage when the voltage at said single ended stage is above a predetermined value, a pair of variable resistance devices associated with the respective control electrodes, each device including a pair of triodes, leads connecting the anode of one triode and the cathode of the other triode to the associated control electrode, leads grounding the cathode of said one triode and the anode of the other triode, means for applying said first voltage and said second voltage to both control grids of the triodes associated with said second amplifier stage, a resistance-capacitance unit connecting the last-named control grids with the control grids of the triodes in the variable resistance device associated with the first amplifier stage, a two position relay, said relay in one position, connecting the second set of control grids to ground through a resistance and, in its other position, grounding the shunt capacities of said high cut filter, and means responsive to the presence of a voltage at said single ended amplifier stage to actuate said relay so as to remove the ground from the second set of control grids and apply ground to the shunt capacities of said high cut filter.

16. In a seismic amplifier constructed in accordance with claim 9, a filter having its output connected to the control grids of the triodes in the voltage divider unit connected to said second tube, and means for applying the output voltage from said push-pull stage and the voltage from said single ended stage to the input of said filter.

References Cited in the file of this patent

UNITED STATES PATENTS

| | | |
|---|---|---|
| 2,326,614 | Bowman | Aug. 10, 1943 |
| 2,352,825 | Fay | July 4, 1944 |
| 2,408,001 | Shimek et al. | Sept. 24, 1946 |
| 2,523,294 | Hallmark | Sept. 26, 1950 |
| 2,554,905 | Hawkins et al. | May 29, 1951 |
| 2,558,954 | Henson | July 3, 1951 |
| 2,582,714 | Meier | Jan. 15, 1952 |
| 2,673,899 | Montgomery | Mar. 30, 1954 |